Patented Feb. 17, 1925.

1,526,633

UNITED STATES PATENT OFFICE.

ALPHONS GAMS, OF BASEL, SWITZERLAND, ASSIGNOR TO SOCIETY OF CHEMICAL INDUSTRY IN BASLE, OF BASEL, SWITZERLAND.

PREPARATION OF SOLUTIONS OF MEDICAMENTS INSOLUBLE OR SPARINGLY SOLUBLE IN WATER.

No Drawing.   Application filed April 30, 1924. Serial No. 710,161.

*To all whom it may concern:*

Be it known that I, ALPHONS GAMS, a citizen of the Swiss Confederation, residing at Basel, Switzerland, have invented new and useful Improvements Relating to the Preparation of Solutions of Medicaments Insoluble or Sparingly Soluble in Water, of which the following is a full, clear, and exact specification.

This invention relates to a method of preparing solutions of medicaments which are insoluble or sparingly soluble in water.

It is known that concentrated aqueous urethane has the property of increasing more or less the solubility in water of many compounds which are insoluble or sparingly soluble in water. From the solutions thus obtained, however, if they are not already very dilute the dissolved substance is precipitated by the addition of water. Thus there can be obtained by this method solutions of diethylbarbituric acid of only 3 per cent strength when it is desired that there shall be no precipitate produced in it when it is diluted with water. It thus happens that this known method of making solutions does not serve for the production of medicaments which can be used in the form of drops and are of practically useful concentration.

According to the present invention solutions of medicaments which are insoluble or sparingly soluble in water can be obtained in considerably concentrated form capable of being used as drops and of being injected by using as a solvent a mixture of water-soluble urea substituted by at least one hydrocarbon, for instance alkyl or alkylene, radical with a water-soluble carbamic acid ester, in some cases in presence of water.

A useful proportion of the constituents of the aforesaid mixture is 1:1 but mixtures in other proportions may be used with useful effect.

The following examples illustrate the invention, the parts being by weight—

*Example 1.*

10 parts of monoethyl-urea and 10 parts of urethane are mixed with 5 parts of water, whereby there is obtained with considerable lowering of the temperature a clear liquid which only solidifies in a mixture of ice and salt. This liquid dissolves diallylbarbituric acid to the extent of 10 per cent of its weight. The neutral solution thus obtained can be injected; when it is dropped into water there is no separation of diallylbarbituric acid and the solution may be sterilized at 100° C.

*Example 2.*

The procedure is the same as in Example 1 with substitution of monomethyl-urea for monoethyl-urea. In this case also the solvent obtained is a liquid mixture which dissolves at the ordinary temperature more than 10 per cent of its weight of diethylbarbituric acid.

*Example 3.*

Like the alkylbarbituric acids the phenylethylbarbituric acid is easily soluble in a mixture of alkyl or alkylene-urea, urethane and water. For instance, there may be used a mixture of 1 part each of asymmetric diallylurea and urethane with ½ part of water; this dissolves 10 per cent of its weight of phenylethylbarbituric acid even below 0° C.

*Example 4.*

Instead of urethane other carbamic acid esters soluble in water can be used. A mixture of carbamic acid allyl ester, asymmetric diallyl-urea and water in the proportion 1:1:1 dissolves about 10% of its weight of phenylethylbarbituric acid at normal temperature and the solution has properties similar to those of the solution obtained as described in Example 1.

*Example 5.*

Diallylbarbituric acid dissolves also in a mixture of diallyl-urea 40 per cent, carbamic acid propyl ester 40 per cent and water 20 per cent. The solution may be used in the form of drops and can be sterilized.

*Example 6.*

4 parts of di-isobutyl-urea, 4 parts of carbamic acid ethyl ester and 2 parts of water yield a mixture which melts at 0° C., and in its liquid condition dissolves easily compounds such as diallylbarbituric acid. When cooled below 0° C. the solution solidifies without separation of diallylbarbituric acid from it, so that when it is re-melted there is immediately produced a clear solution.

Example 7.

A mixture of 40 parts of mono-ethyl-urea, 40 parts of urethane and 20 parts of water dissolves camphor freely. A solution containing 10 per cent of its weight of camphor can be cooled to —10° C. without separation of camphor. Even the introduction of crystals does not cause any separation. Under like conditions a solution composed as above, except that for the mono-ethyl-urea there is substituted asymmetric diallyl-urea, dissolves over 20 per cent of its weight of camphor.

Example 8.

A solution consisting of diallyl-urea 40 per cent urethane 40 per cent and water 20 per cent dissolves over 20 per cent of its weight of quinine even at ordinary temperature.

Example 9.

Benzylalcohol is miscible with the solvent described in Example 8 in all proportions at ordinary temperature.

Example 10.

A solution consisting of 4 parts of symmetrical dimethyl-urea, 4 parts of urethane and 2 parts of water is miscible with its own volume of paraldehyde without turbidity at the temperature of the room.

Example 11.

A mixture of equal parts of asymmetric diallyl-urea, urethane and water dissolves 10 per cent of its weight of sandal wood oil at room temperature. When dropped into water the solution remains quite clear.

Besides the above-named substances a whole series of other compounds insoluble or sparingly soluble in water are capable of forming solutions adapted for use as drops and for injection with the aid of mixtures of alkyl or alkylene-ureas which are soluble in water, and urethanes which are soluble in water. Examples of other compounds which can be so dissolved are purins, like theophyllin; pyrazolones, like dimethyl-amino-phenyldimethylpyrazolone; acid esters, such as para-amino-benzoic acid ethyl ester; alkaloids, and so on. In the same way solutions of mixtures of medicaments may of course also be prepared by means of the new solvent.

What I claim is:

1. As an article of manufacture for use in therapeutics a solvent comprising a mixture of a water-soluble urea substituted by at least one hydrocarbon radical with a water-soluble carbamic acid ester.

2. As an article of manufacture for use in therapeutics a solvent comprising a mixture of a water-soluble urea substituted by at least one hydrocarbon radical with a water-soluble carbamic acid ester and water.

3. As an article of manufacture for use in therapeutics a solvent comprising a mixture of a water-soluble alkyl urea with a water-soluble carbamic acid ester.

4. As an article of manufacture for use in therapeutics a solvent comprising a mixture of a water-soluble alkyl urea with a water-soluble carbamic acid ester and water.

5. As an article of manufacture for use in therapeutics a solvent comprising a mixture of ethyl urea with carbamic acid ethylester.

6. As an article of manufacture for use in therapeutics a solvent comprising a mixture of ethyl urea with carbamic acid ethylester and water.

7. As an article of manufacture for use in therapeutics a solvent comprising a mixture of two parts of ethyl urea with two parts of carbamic acid ethylester and one part of water.

8. As articles of manufacture, solutions of medicaments insoluble or sparingly soluble in water in the solvent claimed in claim 1, which solutions are capable of being injected or used as drops.

9. As articles of manufacture, solutions of medicaments insoluble or sparingly soluble in water in the solvent claimed in claim 2, which solutions are capable of being injected or used as drops.

10. As articles of manufacture, solutions of medicaments insoluble or sparingly soluble in water in the solvent claimed in claim 3, which solutions are capable of being injected or used as drops.

11. As articles of manufacture, solutions of medicaments insoluble or sparingly soluble in water in the solvent claimed in claim 4, which solutions are capable of being injected or used as drops.

12. As articles of manufacture, solutions of medicaments insoluble or sparingly soluble in water in the solvent claimed in claim 5, which solutions are capable of being injected or used as drops.

13. As articles of manufacture, solutions of medicaments insoluble or sparingly soluble in water in the solvent claimed in claim 6, which solutions are capable of being injected or used as drops.

14. As articles of manufacture, solutions of medicaments insoluble or sparingly soluble in water in the solvent claimed in claim 7, which solutions are capable of being injected or used as drops.

15. As articles of manufacture, solutions of barbituric acid derivatives insoluble or sparingly soluble in water in the solvent claimed in claim 1, which solutions are capable of being injected or used as drops.

16. As articles of manufacture, solutions of barbituric acid derivatives insoluble or sparingly soluble in water in the solvent claimed in claim 2, which solutions are capable of being injected or used as drops.

17. As articles of manufacture, solutions of barbituric acid derivatives insoluble or sparingly soluble in water in the solvent claimed in claim 3, which solutions are capable of being injected or used as drops.

18. As articles of manufacture, solutions of barbituric acid derivatives insoluble or sparingly soluble in water in the solvent claimed in claim 4, which solutions are capable of being injected or used as drops.

19. As articles of manufacture, solutions of barbituric acid derivatives insoluble or sparingly soluble in water in the solvent claimed in claim 5, which solutions are capable of being injected or used as drops.

20. As articles of manufacture, solutions of barbituric acid derivatives insoluble or sparingly soluble in water in the solvent claimed in claim 6, which solutions are capable of being injected or used as drops.

21. As articles of manufacture, solutions of barbituric acid derivatives insoluble or sparingly soluble in water in the solvent claimed in claim 7, which solutions are capable of being injected or used as drops.

22. As an article of manufacture a solution of diallylbarbituric acid in a mixture of two parts of ethyl urea with two parts of carbamic acid ethylester and one part of water.

In witness whereof I have hereunto signed my name this 17th day of April 1924, in the presence of two subscribing witnesses.

ALPHONS GAMS.

Witnesses:
 AMAND BRAUES,
 MADELEINE SPENGLER.